(12) United States Patent
Cho et al.

(10) Patent No.: US 9,378,396 B2
(45) Date of Patent: Jun. 28, 2016

(54) STORAGE DEVICE AND MEMORY CONTROLLER THEREOF

(71) Applicant: SAMSUNG ELECTRONICS CO., LTD., Suwon-si (KR)

(72) Inventors: Youngjin Cho, Seoul (KR); Hyunsik Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/700,936

(22) Filed: Apr. 30, 2015

(65) Prior Publication Data

US 2015/0235056 A1   Aug. 20, 2015

Related U.S. Application Data

(62) Division of application No. 13/674,174, filed on Nov. 12, 2012, now Pat. No. 9,049,005.

(30) Foreign Application Priority Data

Feb. 28, 2012   (KR) .................. 10-2012-0020322

(51) Int. Cl.
  *G06F 21/78*   (2013.01)
  *H04L 9/08*    (2006.01)
  *G06F 21/72*   (2013.01)

(52) U.S. Cl.
  CPC ............... *G06F 21/78* (2013.01); *G06F 21/72* (2013.01); *H04L 9/08* (2013.01); *H04L 9/0861* (2013.01)

(58) Field of Classification Search
  CPC .................................. G06F 21/78; H04L 9/08
  USPC ......................................................... 380/277
  See application file for complete search history.

(56) References Cited

U.S. PATENT DOCUMENTS

| | | | |
|---|---|---|---|
| 5,687,237 A | 11/1997 | Naclerio | |
| 7,522,723 B1 | 4/2009 | Shaik | |
| 7,877,603 B2 | 1/2011 | Goodman et al. | |
| 7,934,049 B2 | 4/2011 | Holtzman et al. | |
| 2003/0065933 A1* | 4/2003 | Hashimoto | G06F 21/123 713/194 |
| 2007/0061581 A1 | 3/2007 | Holtzman et al. | |
| 2007/0136606 A1* | 6/2007 | Mizuno | G06F 21/78 713/189 |
| 2008/0065882 A1 | 3/2008 | Goodman et al. | |
| 2008/0101605 A1* | 5/2008 | Kitamura | H04N 21/23103 380/239 |
| 2009/0196417 A1* | 8/2009 | Beaver | G06F 21/80 380/45 |
| 2010/0250959 A1* | 9/2010 | Challener | H04L 9/3226 713/189 |
| 2011/0047376 A1* | 2/2011 | Mittal | G06F 12/1441 713/164 |
| 2011/0082866 A1* | 4/2011 | Brown | H04L 45/00 707/744 |
| 2013/0173931 A1* | 7/2013 | Tzafrir | G06F 21/57 713/193 |
| 2013/0223628 A1* | 8/2013 | Cho | H04L 9/0897 380/277 |
| 2015/0235056 A1* | 8/2015 | Cho | G06F 21/78 713/189 |

* cited by examiner

*Primary Examiner* — Dao Ho
(74) *Attorney, Agent, or Firm* — Sughrue Mion, PLLC

(57) ABSTRACT

A memory controller controlling a nonvolatile memory is provided. The memory controller includes an encryption key feeder configured to feed a cipher key according to a logical address transferred from a host; and an encryption engine configured to perform an encryption operation on data transferred from the host or a decryption operation on data transferred from the nonvolatile memory device, using the cipher key provided from the encryption key feeder.

13 Claims, 14 Drawing Sheets

STORAGE DEVICE AND MEMORY CONTROLLER THEREOF

CROSS-REFERENCE TO RELATED APPLICATIONS

This application is a Divisional of U.S. application Ser. No. 13/674,174 filed Nov. 12, 2012, which claims priority from Korean Patent Application No. 10-2012-0020322 filed Feb. 28, 2012, in the Korean Intellectual Property Office, the entire contents of which are hereby incorporated by reference.

BACKGROUND

Apparatuses, devices, and articles of manufacture consistent with the present disclosure relate to a storage device, and more particularly, relate to a storage device supporting an encryption operation and a memory controller thereof.

Semiconductor memory devices mainly used as a storage device may include volatile memories such as a dynamic random access memory (DRAM), a static RAM (SRRAM), and the like and nonvolatile memories such as an electrically erasable and programmable ROM (EEPROM), a ferroelectric RAM (FRAM), a phase-change RAM (PRAM), a magnetoresistive RAM (MRAM), a flash memory, and the like. The volatile memories may lose contents stored therein at power-off, while the nonvolatile memories may retain contents stored therein even at power-off.

In recent years, devices using a nonvolatile memory may increase. For example, an MP3 player, a digital camera, a cellular phone, a camcorder, a flash card, and a solid state disk (SSD) may use a nonvolatile memory as a storage device. Among nonvolatile memories, a flash memory may support a function of electrically erasing cell data in a lump. This may enable the flash memory to be widely used as a storage device instead of a hard disk drive.

As use in the storage device increases, the security of data stored in the storage device may become important. Herein, the security of data may be accomplished by preventing unpermitted user from reading data stored in the storage device.

SUMMARY

According to an aspect of an exemplary embodiment, there is provided a memory controller which controls a nonvolatile memory and includes an encryption key feeder configured to feed a cipher key according to a logical address transferred from a host; and an encryption engine configured to perform an encryption operation on data transferred from the host or a decryption operation on data transferred from the nonvolatile memory device, using the cipher key provided from the encryption key feeder.

The encryption key feeder may include a key mapper configured to manage key indexes corresponding to logical address ranges, and the key mapper may compare a logical address transferred from the host with the logical address ranges.

The encryption key feeder may further include a key table module configured to manage cipher keys corresponding to the logical address ranges, and the key mapper may send a key index corresponding to one of the logical address ranges when a logical address transferred from the host belongs to the one of the logical address ranges.

The key table module may provide the encryption engine with a cipher key, corresponding to the key index, from among the cipher keys.

The memory controller may further include a microprocessor configured to control the encryption engine and the encryption key feeder. The key mapper may provide an interrupt signal to the microprocessor when a logical address transferred from the host does not belong to any of the logical address ranges.

The microprocessor may add a logical address range including the logical address to the key mapper in response to the interrupt signal.

The key mapper may include a first register that stores location information of a logical address range, of which a search operation starts, from among the logical address ranges; and a second register that stores location information of a logical address range, of which a search operation is being performed, from among the logical address ranges.

When a first logical address provided from the host does not belong to a first logical address range of the logical address ranges, the key mapper may compare the first logical address with a next logical address range of the logical address ranges and stores location information of the next logical address range at the second register.

The key mapper may receive a second logical address from the host following an input of a first logical address. When the first logical address belongs to a first logical address range of the logical address ranges, the key mapper may compare the second logical address with the first logical address range.

The key mapper may comprise a first comparator configured to compare a logical block address (LBA) lower bound value of the logical address range with the logical address; a second comparator configured to compare an LBA upper bound value of the logical address range with the logical address; and a logic gate configured to logically combine an output value of the first comparator and an output value of the second comparator.

According to an aspect of another exemplary embodiment, there is provided a storage device including a nonvolatile memory device; and a memory controller configured to control the nonvolatile memory device. The memory controller includes an encryption engine configured to perform an encryption operation on data to be stored in the nonvolatile memory device or a decryption operation on data stored in the nonvolatile memory device; and an encryption key feeder configured to provide the encryption engine with a cipher key according to a logical address provided from a host.

The encryption key feeder may include a key mapper including a plurality of key index entries, each of the plurality of key index entries managing a logical address range and information associated with a key index; and a key table module including a plurality of encryption key entries, each of the plurality of encryption key entries managing information associated with a cipher key corresponding to the key index.

The key mapper may include a search module configured to compare a logical address provided from a host with a logical address range of one selected from the plurality of key index entries; and a current index register configured to store location information on an index, of which a search operation is being performed by the search module, of the plurality of key index entries.

The key mapper may further include a search start register configured to store location information on an entry, of which a search operation starts, of the plurality of key index entries.

When the first logical address belongs to a logical address range of a first key index entry of the plurality of key index entries, the search module may first compare a second logical address provided following the first logical address with a logical address range of the first index entry of the plurality of key index entries.

BRIEF DESCRIPTION OF THE DRAWINGS

The above and other aspects will become apparent from the following description with reference to the following figures, wherein like reference numerals refer to like parts throughout the various figures unless otherwise specified, and wherein.

DETAILED DESCRIPTION

Figure 1:
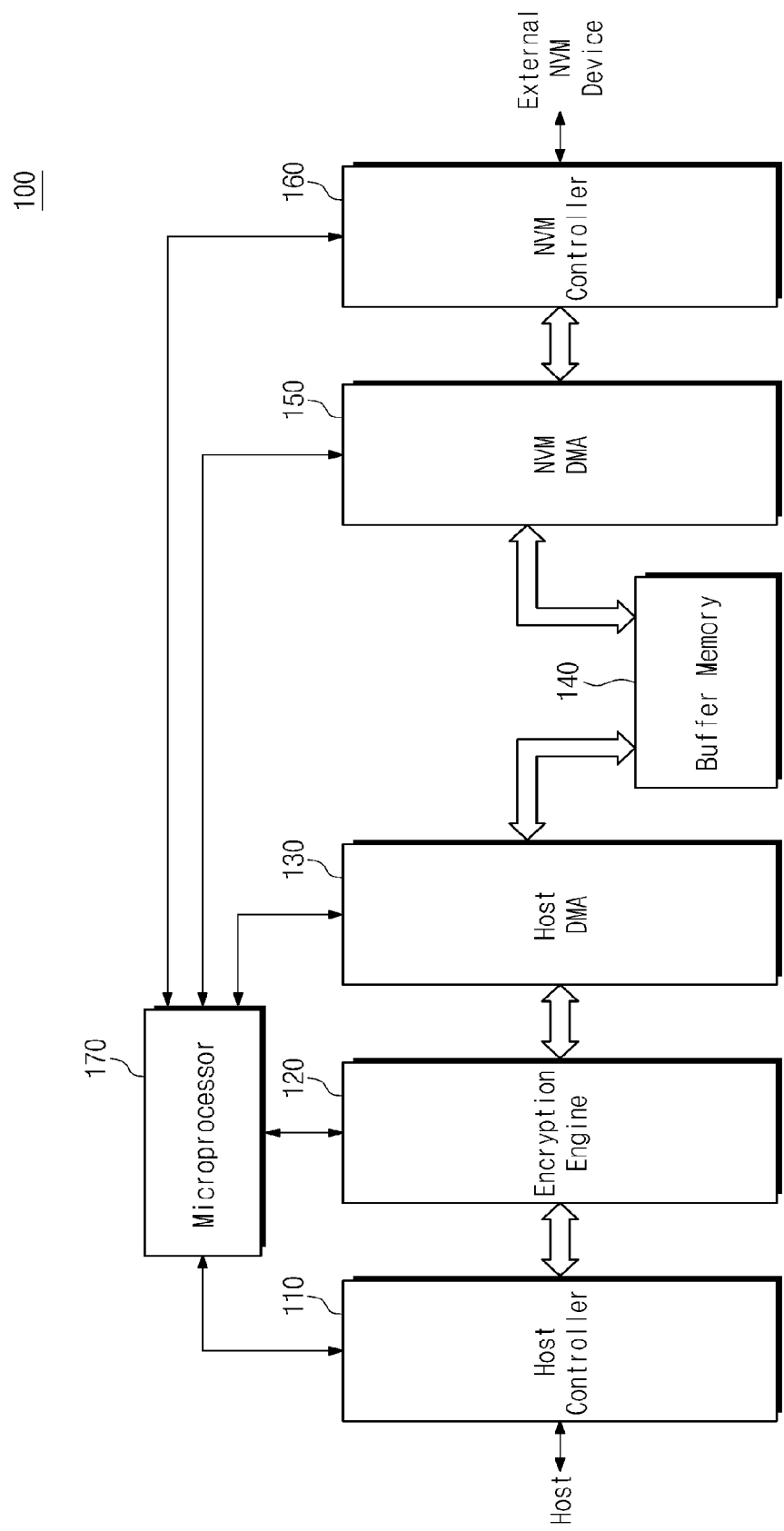
FIG. 1 is a block diagram schematically illustrating an encryption device according to an exemplary embodiment.

Exemplary embodiments will be described in detail with reference to the accompanying drawings. The inventive concept, however, may be embodied in various different forms, and should not be construed as being limited only to the illustrated exemplary embodiments. Rather, these exemplary embodiments are provided as examples so that this disclosure will be thorough and complete, and will fully convey the concept of the inventive concept to those skilled in the art. Accordingly, known processes, elements, and techniques are not described with respect to some of the exemplary embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, a storage device using a nonvolatile memory device may be exemplarily used to describe the inventive concept. Also, a flash memory may be used as a nonvolatile memory. Alternatively, MRAM, ReRAM, FRAM, PRAM, NOR flash memory, and the like may be used as a nonvolatile memory, or a combination of heterogeneous memory devices may be used as a nonvolatile memory.

There will be exemplarily described the case that a logical block address (LBA) is transferred from a host. However, the inventive concept is not limited thereto. For example, logical addresses such as a logical page address, a logical sector address, and the like may be provided from host.

FIG. 1 is a block diagram schematically illustrating an encryption device according to an exemplary embodiment. An encryption engine 100 in FIG. 1 may be used as a memory controller for controlling an external nonvolatile memory device, and may include an encryption engine 120 for the security of data stored in the nonvolatile memory device.

Referring to FIG. 1, the encryption device 100 may include a host controller 110, the encryption engine 120, a host direct memory access (hereinafter, referred to as a host DMA) 130, a buffer memory 140, a nonvolatile memory (NVM) direct memory access (hereinafter, referred to as an NVM DMA) 150, a nonvolatile memory (NVM) controller 160, and a microprocessor 170.

The host controller 110 may provide physical interconnection between a host and the encryption device 100. That is, the host controller 110 may be configured to interface with the host according to a bus format of the host. The host format may include Universal Serial Bus (USB), PCI express, ATA, Parallel ATA (PATA), Serial ATA (SATA), or the like.

The host controller 110 may support a disk emulation function that enables the host to recognize the encryption device 100 and an external nonvolatile memory device connected to the encryption device 100 as a hard disk drive (HDD). For example, the host controller 110 may provide a function such as a flash translation layer (FTL) for hiding an erase operation.

The encryption engine 120 may perform an encryption operation for safely storing user data, which is transferred from a host, in an external NVM device. The encryption engine 120 may perform a decryption operation for providing encrypted data stored in the external NVM device to the host. The encryption engine 120, for example, may be implemented to coincide with Data Encryption Standard (DES), Triple-Data Encryption Standard (T-DES), Advanced Encryption Standard (AES), and the like.

The host DMA 130 may be in charge of a data transfer between the host and the buffer memory 140. For example, the host DMA 130 may transfer data encrypted by the encryption engine 120 to the buffer memory 140, or may transfer data temporarily stored in the buffer memory 140 to the encryption engine 120.

The buffer memory 140 may temporarily store encrypted data transferred from a host side. The buffer memory 140 may temporarily store encrypted data read out from the external NVM device. The buffer memory 140 may be formed of a volatile memory such as DRAM, SRAM, or the like. However, the inventive concept is not limited thereto. For example, the buffer memory 116 may be formed of a nonvolatile memory such as a flash memory or the like.

The NVM DMA 150 may be in charge of a data transfer between the buffer memory 140 and the NVM controller 160. For example, the NVM DMA 150 may transfer encrypted data read out from the external NVM device to the buffer memory 140.

The NVM controller 160 may be in charge of an interface between the encryption device 100 and the external NVM device. For example, the NVM controller 160 may be connected to the external NVM device via a plurality of channels, and may distribute encrypted data transferred from a host side to the external NVM device at a write operation. The NVM controller 160 may receive encrypted data read out from the external NVM device via the plurality of channels at a read operation.

The microprocessor 170 may control an overall operation of the encryption device 100. At a write operation or a read operation, the microprocessor 170 may receive a logical block address (LBA) from a host to provide the encryption engine 120 with an encryption key corresponding to the input logical block address. The encryption engine 120 may be configured to encrypt data or decrypt encrypted data, using the encryption key.

As described above, the encryption device 100 according to an exemplary embodiment may be configured to search for an encryption key corresponding to a logical block address using the microprocessor 170. In this case, limited performance of the microprocessor 170 due to the search for the encryption key may force performance to be lowered as to a read or write operation.

An external NVM device connected to the encryption device 100 may be divided into a plurality of partitions logically or physically. Different encryption algorithms and encryption keys may be applied to the partitions. In this case, the microprocessor 170 may search for an encryption key corresponding to a logical block address transferred from a host in the light of each partition. Thus, the performance of the read or write operation may be further lowered due to the additional burden on the microprocessor 170.

Other exemplary embodiments for reducing the burden of the microprocessor 170 and improving the read or write performance will be described below.

Figure 2:
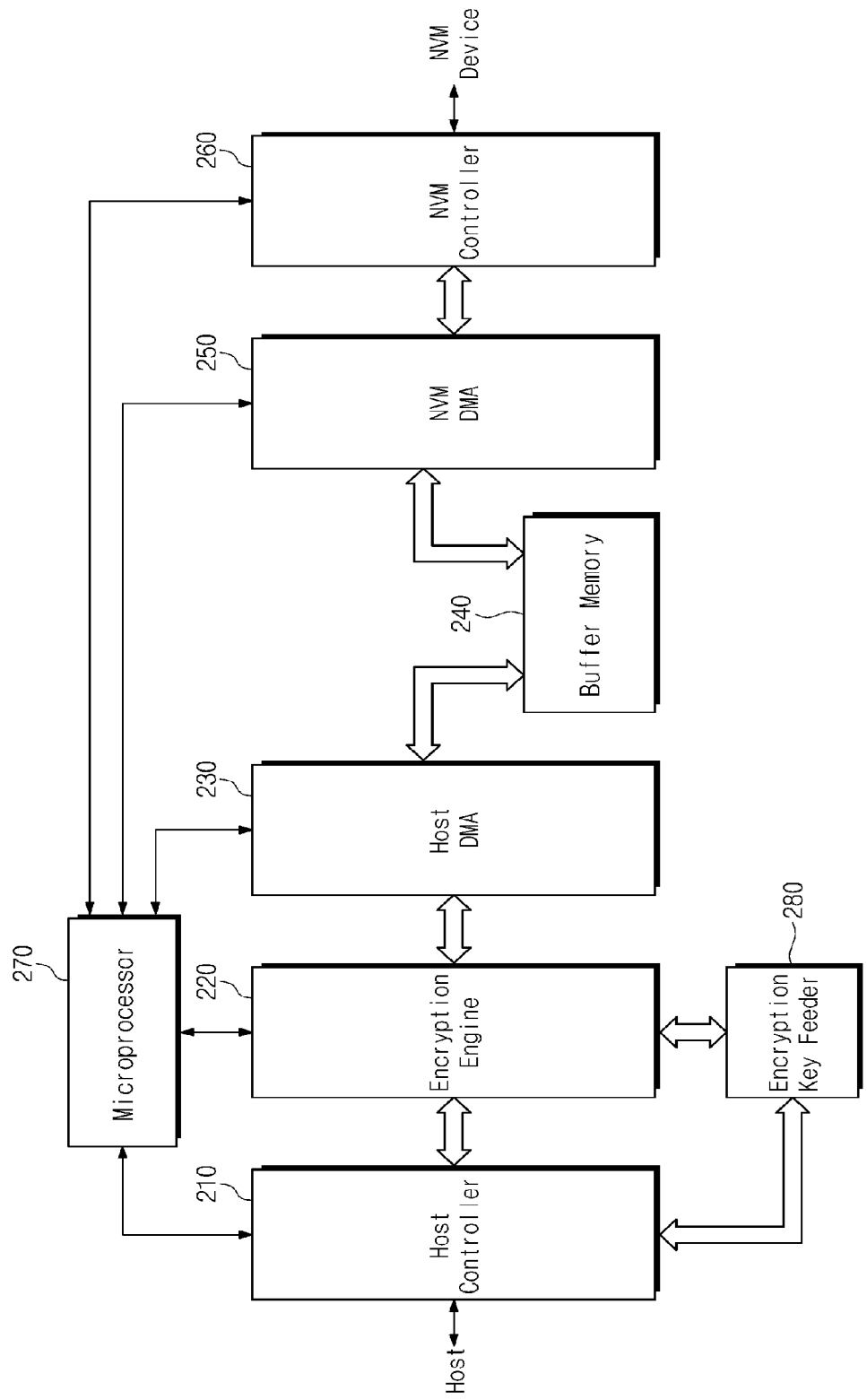
FIG. 2 is a block diagram schematically illustrating an encryption device according to another exemplary embodiment.

FIG. 2 is a block diagram schematically illustrating an encryption device according to another exemplary embodiment. In FIG. 2, elements that are similar to that in FIG. 1 are marked by similar reference numerals, and description thereof is thus omitted.

Compared with an encryption device 100 in FIG. 1, the encryption device in FIG. 2 may further include an encryption key feeder 280. The encryption key feeder 280 may receive a logical block address LBA from a host controller 210, and may search for an encryption algorithm, an encryption key, and the like corresponding to the input logical block address to provide the encryption algorithm, the encryption key, and the like to an encryption engine 220. The encryption engine 220 may perform an encryption operation or a decryption operation using the transferred encryption algorithm and encryption key.

With the encryption device 200, the burden of a microprocessor 270 may be reduced by the encryption key feeder 280 that is separately provided to search for an encryption key and so on. Thus, it is possible to prevent the performance from being lowered at a read or write operation. Further, in the event that an external NVM device is divided into a plurality of partitions, the performance may become higher than that of the encryption device 100 in FIG. 1.

Figure 3:
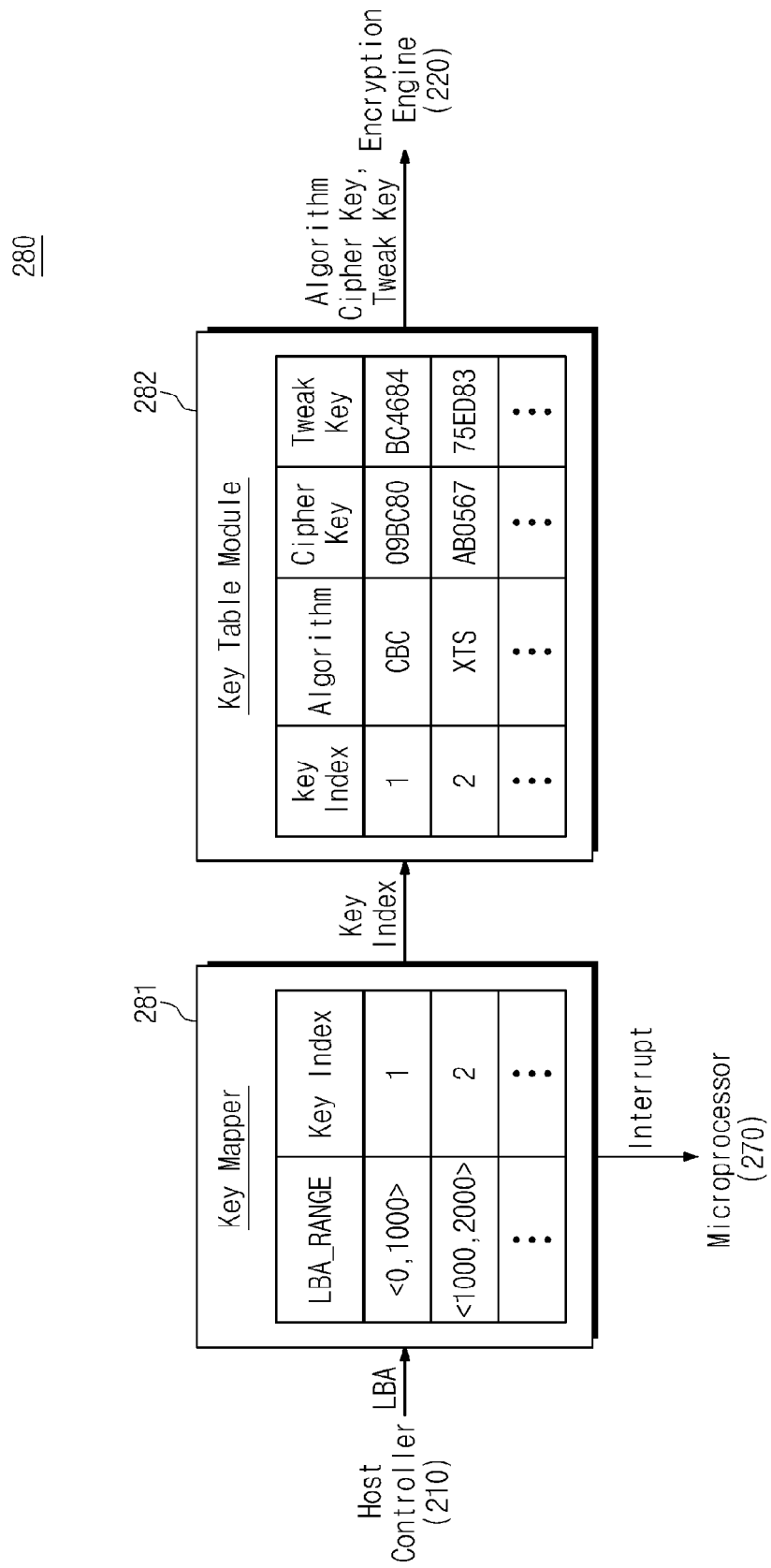
FIG. 3 is a block diagram schematically illustrating an encryption key feeder in FIG. 2.

FIG. 3 is a block diagram schematically illustrating an encryption key feeder in FIG. 2. Referring to FIG. 3, an encryption key feeder 280 may include a key mapper 281 and a key table module 282.

The key mapper 281 may include a table having a plurality of entries. The table of the key mapper 281 may be used to manage information associated with a logical block address range LBA_RANGE and information associated with a key index corresponding to the logical block address range LBA_RANGE. The key mapper 281 may receive a logical block address LBA from a host via a host controller 210 (refer to FIG. 1), and may determine whether there is a logical block address range LBA_RANGE which the input logical block address LBA belongs to In the event that there is a logical block address range LBA_RANGE which the input logical block address LBA belongs to, the key mapper 281 may provide the key table module 282 with a key index corresponding to the logical block address range LBA_RANGE.

If there is no logical block address range LBA_RANGE which the input logical block address LBA belongs to, the key mapper 281 may generate an interrupt signal and send the interrupt signal to a microprocessor 270 (refer to FIG. 2). The microprocessor 270 may perform a given operation in response to the interrupt signal.

For example, an interrupt signal may be generated when a password of data (or, partition) to be accessed by a host does not coincide with a password input from the host. In this case, the microprocessor 270 may inform the host that an access to corresponding data is not authorized, by sending an abort signal to the host via the host controller 210.

In another exemplary embodiment, in the event that although an access authority on data to be accessed is endowed the endowed access authority is not managed by the key mapper 281, an interrupt signal may be generated. In this case, the microprocessor 270 may perform an operation of adding an entry corresponding to a corresponding logical block address to the key mapper 281.

The key table module 282 may include a table having a plurality of entries. The table of the key table module 282 may be used to manage encryption information such as information associated with an encryption algorithm, information associated with a cipher key, information associated with a tweak key, and the like. However, the inventive concept is not limited thereto. For example, the table may be changed variously according to an encryption method and a design method.

The key table module 282 may receive a key index from the key mapper 282 to provide an encryption engine 220 (refer to FIG. 2) with encryption information corresponding to the input key index. The encryption engine 220 may perform an encryption or decryption operation using encryption information transferred from the key table module 282.

An entry number of the key table module 282 may be identical to that of the key mapper 281. For example, if the entry number of the key table module 282 is less than that of the key mapper 281, one entry of the key table module 282 may share two or more entries of the key mapper 281.

The table of the key mapper 281 and the table of the key table module 282 may be stored in a buffer memory 240 or in a memory independent from the buffer memory 240. Alternatively, the table of the key mapper 281 and the table of the key table module 282 may be located on a bus. In another exemplary embodiment, the table of the key mapper 281 and the table of the key table module 282 may be stored in an external NVM device, and may be, for example, loaded onto the buffer memory 240 at power-up.

Figure 4:
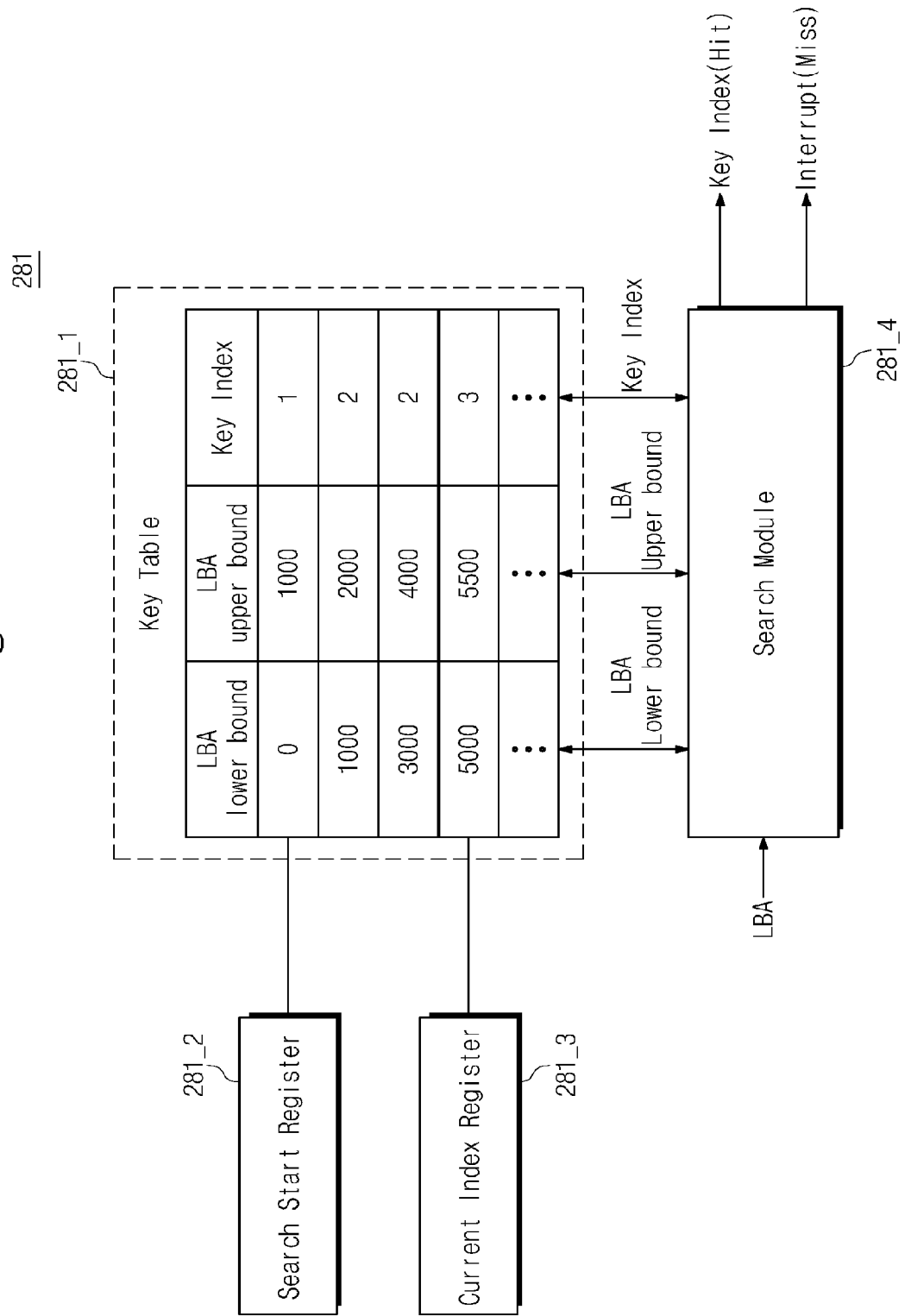
FIG. 4 is a detailed block diagram of a key mapper in FIG. 3.

FIG. 4 is a detailed block diagram of a key mapper 281 in FIG. 3. Referring to FIG. 4, a key mapper 281 may include a key table 281_1, a search start register 281_2, a current index register 281_3, and a search module 281_4.

The key table 281_1 has a plurality of entries, and may be used to manage information associated with a logical block address range LBA_RANGE and a key index. An entry of the key table 281_1 may be information associated with a logical block address range, and may be used to manage values, related to a lower bound and an upper bound of a logical block address LBA, and a value of a corresponding key index. As illustrated in FIG. 4, there may be the case that different entries have the same key index.

The search start register 281_2 may be used to record a location of an entry, the search operation of which is started, from among a plurality of entries of the key table 281_1. For example, in a case where a search operation starts from an entry corresponding to a logical block range of <0, 1000>, the search start register 281_2 may take a value of '0' to a corresponding entry, and may store a result.

The current index register 281_3 may be used to record a location of an entry, the search operation of which is being currently performed, from among the plurality of entries of the key table 281_1. For example, in the case that a search operation of an entry corresponding to a logical block range of <0, 1000> is being performed first, the current index register 281_3 may take the same value ('0') as a value of the search start register 281_2 to a corresponding entry, and may store a result.

If an entry does not include a logical block address LBA transferred from a host, a next entry (hereinafter, referred to as a second entry) may be searched. At this time, the current index register 281_3 may take a value of '1' for the second entry, and may store a result. The current index register 281_3 may take a value increased by '1' whenever a search operation is performed for an entry, and may store a result.

If the key table 281_1 does not have an entry, that is, when all entries of the key table 281_1 are searched, the current index register 281_3 may again state the same value as that taken for an entry the search operation of which is first performed, that is, '0'.

The search module 281_4 may receive a logical block address LBA from a host and LBA lower and upper bounds and a key index managed at a selected entry of the key table 281_1. The search module 281_4 may perform a search operation for determining whether a logical block address LBA provided from the host belongs to a logical block range of a selected entry.

When a logical block address LBA provided from the host does not belong to a logical block range of a selected entry, the search module 281_4 may perform a search operation on a next entry.

If a logical block address LBA provided from the host belongs to a logical block range of a selected entry, the search module 281_4 may determine a corresponding entry as a hit entry, and may transfer a key index of the hit entry to a key table module 282 (refer to FIG. 3).

If a logical block address LBA provided from the host does not belong to a logical block range of a selected entry, that is, when a value stored in the search start register 281_2 is equal to that stored in the current index register 281_3, the search module 281_4 may determine a corresponding logical block address LBA as a miss, and may send an interrupt signal to a microprocessor 270.

A request and a logical block address LBA transmitted from a host may have temporal and spatial localities. Thus, an entry corresponding to a currently requested logical block address may have temporal and spatial localities similar to that of an entry determined to be a hit entry. For this reason, if a search operation on an entry corresponding to a currently requested logical block address is performed, the search start register 281_2 may assign an entry being currently searched to an entry previously determined to be a hit entry. As a result, a time taken to search an entry may be reduced.

Also, while an encryption engine 220 (refer to FIG. 2) performs an encryption or decryption operation using an entry previously determined to be a hit entry, a current command and logical block address may be received. In this case, if an entry previously determined to be a hit entry is lost, an encryption or decryption operation may be performed abnormally. In particular, in case that the number of entries managed by the key table 281_1 is limited to a certain value, the chance that an entry previously determined to be a hit entry is lost may exist. This loss may be prevented by providing a microprocessor 270 with information associated with an entry determined to be a hit entry such that a corresponding entry in the key table 281_1 is not deleted.

Figure 5:
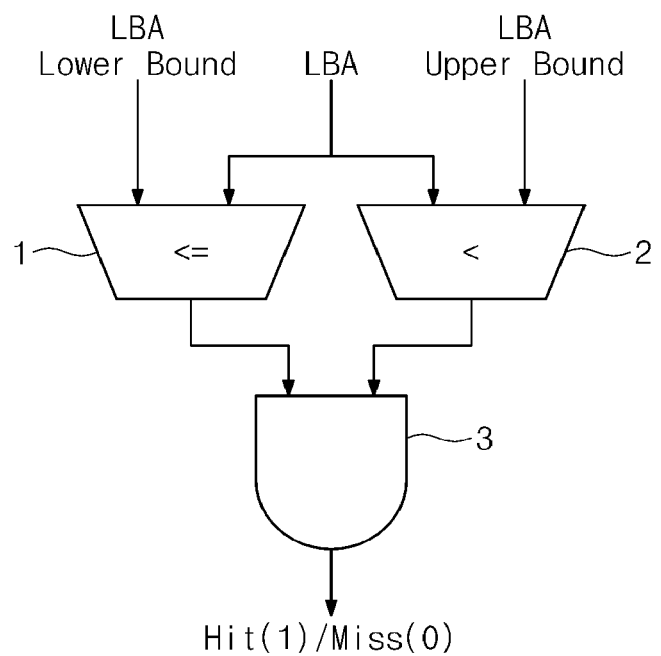
FIG. 5 is a block diagram schematically illustrating a search module in FIG. 4.

FIG. 5 is a block diagram schematically illustrating a search module in FIG. 4. Referring to FIG. 5, a search module 281_4 may include two comparators, a first comparator 1 and a second comparator 2 and an AND gate 5, and may perform an operation of deciding a hit or miss.

The first comparator 1 may compare an LBA lower bound with a logical block address LBA. When a value of the logical block address LBA is larger than the LBA lower bound, the first comparator 1 may output a value of '1'. When a value of the logical block address LBA is smaller than the LBA lower bound, the first comparator 1 may output a value of '0'.

The second comparator 2 may compare an LBA upper bound with a logical block address LBA. When a value of the logical block address LBA is smaller than the LBA upper bound, the second comparator 2 may output a value of '1'. When a value of the logical block address LBA is larger than or equal to the LBA upper bound, the second comparator 2 may output a value of '0'.

The AND gate 3 may AND outputs of the first comparator 1 and the second comparator 2. The AND gate 3 may output a value of '1' based on input values, which denotes a hit. The AND gate 3 may output a value of '0' based on input values, which denotes a miss.

Figure 6:
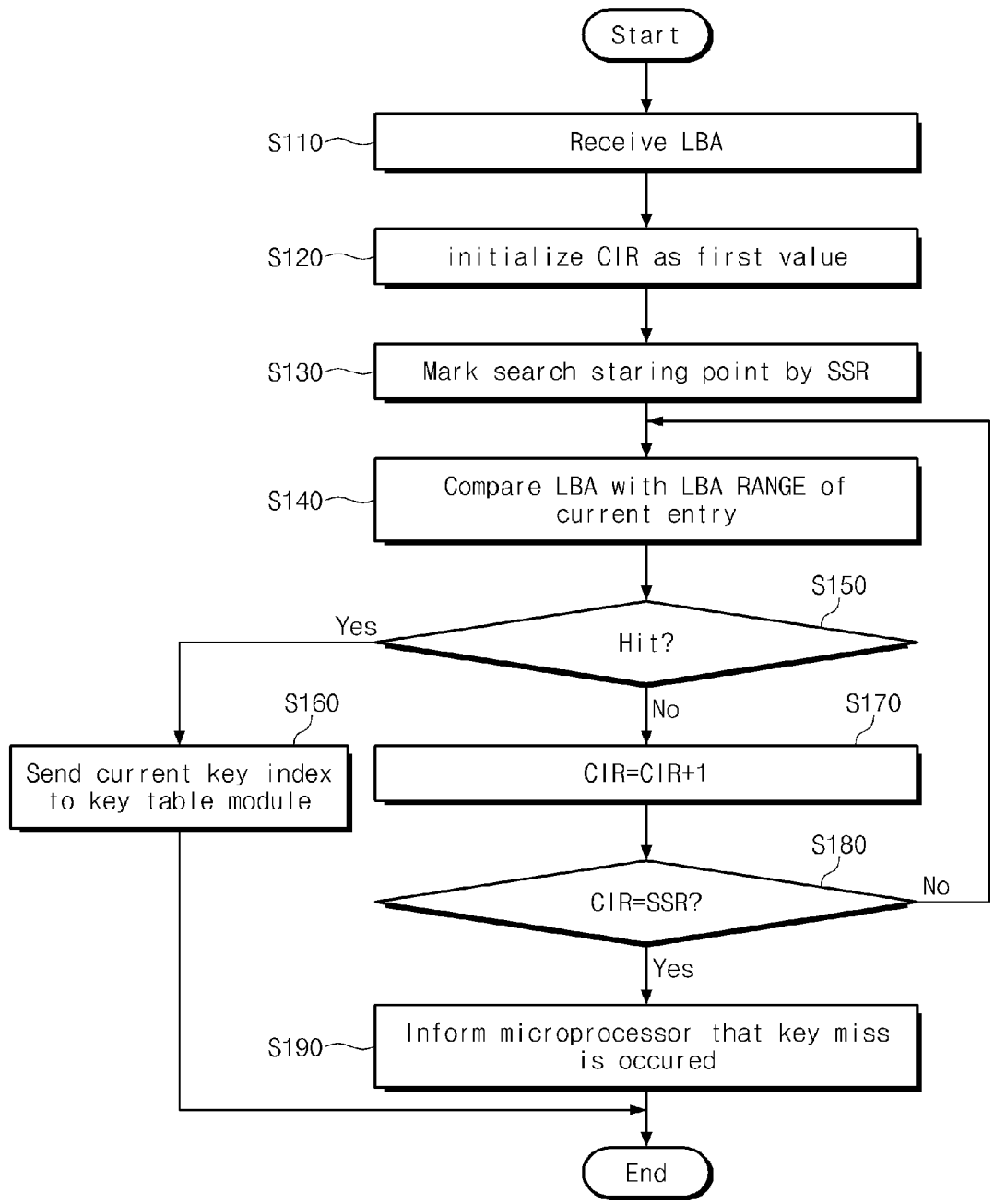
FIG. 6 is a flowchart illustrating an operation of a key mapper in FIG. 4.

FIG. 6 is a flowchart illustrating an operation of a key mapper in FIG. 4.

In operation S110, a key mapper 281 may receive a logical block address LBA via a host controller 210 (refer to FIG. 2).

In operation S120, a current index register (CIR) 281_3 of the key mapper 281 may be reset to a first value. For example, a value of the current index register 281_3 may be reset to a value of '0'.

In operation S130, a location of an entry of a key table 281_1 the search operation of which is started may be marked by a search start register (SSR) 281_2. For example, when a value of '0' stored in the current index register 281_3 is backed up at the search start register 281_2, an entry indicated by the current index register 281_3 may be backed up at the search start register 281_2.

In operation S140, the search module 281_4 may compare the logical block address LBA with a logical block address range LBA_RANGE of a currently selected entry. In operation S150, the search module 281_4 may determine whether the logical block address LBA belongs to the logical block address range LBA_RANGE of the currently selected entry, based on a comparison result.

When the logical block address LBA is determined to belong to the logical block address range LBA_RANGE of the currently selected entry ("Yes" in operation S150), in operation S160, the search module 281_4 may send a key index value of the selected entry to a key table module 282 (refer to FIG. 3).

When the logical block address LBA is determined not to belong to the logical block address range LBA_RANGE of the currently selected entry ("No" in operation S150), in operation S170, the search module 281_4 may select a next index of indexes of the key table 281_1, and may increase a value stored in the current index register 281_3 by "1". In operation S180, the search module 281_4 may determine whether a value stored in the current index register 281_3 coincides with a value stored in the search start register 281_2.

When a value stored in the current index register 281_3 coincides with a value stored in the search start register 281_2 ("Yes" in operation S180), in operation S190, the search module 281_4 may determine the value to be miss, and may send an interrupt signal to a microprocessor 270.

When a value stored in the current index register 281_3 does not coincide with a value stored in the search start register 281_2 ("No" in operation S180), the search module 281_4 may perform an operation of comparing the selected index with a value of the logical block address LBA.

As described with reference to FIGS. 2 to 6, an encryption device 200 in FIG. 2 may include an encryption key feeder 280 that provides an encryption engine 200 with an encryption algorithm, a cipher key, and the like. The encryption device 200 may reduce a burden of the microprocessor 270 via the encryption key feeder 280. Thus, it is possible to prevent the performance from being lowered at a read or write operation.

The encryption device 200 is applicable to various fields. Below, applications of the encryption device 200 will be described.

Figure 7:
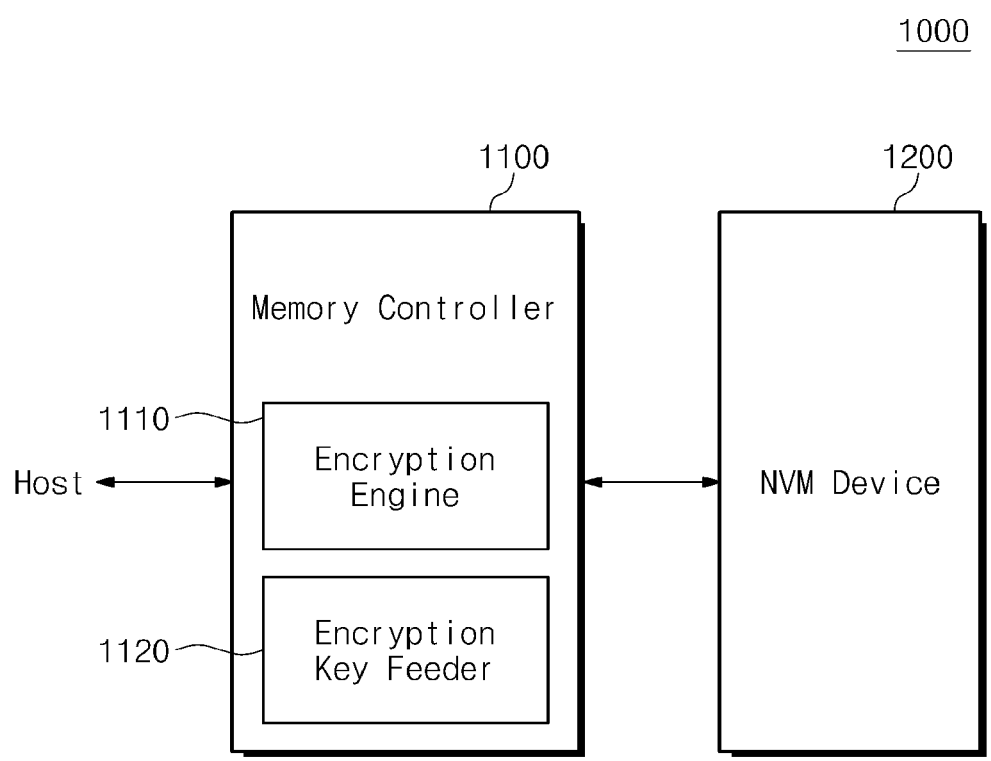
FIG. 7 is a block diagram schematically illustrating a storage device according to an exemplary embodiment.

FIG. 7 is a block diagram schematically illustrating a storage device according to an exemplary embodiment. Referring to FIG. 7, a storage device 1000 may include a memory controller 1100 and a nonvolatile memory (NVM) device 1200. The memory controller 1100 may include an encryption engine 1110 and an encryption key feeder 1120.

The memory controller 1100 may control operations (e.g., reading, writing, erasing, etc.) of the NVM device 1200. The memory controller 1100 may encrypt data transferred from a host using the encryption engine 1110 and the encryption key feeder 1120, and may store the encrypted data in the NVM device 1200. The memory controller 1100 may decrypt encrypted data stored in the NVM device 1200 using the encryption engine 1110 and the encryption key feeder 1120, and may send the decrypted data to the host. That is, as illustrated in FIG. 7, an encryption device 200 (refer to FIG. 2) may be used as the memory controller 1100 for controlling the NVM device 1200.

Figure 8:
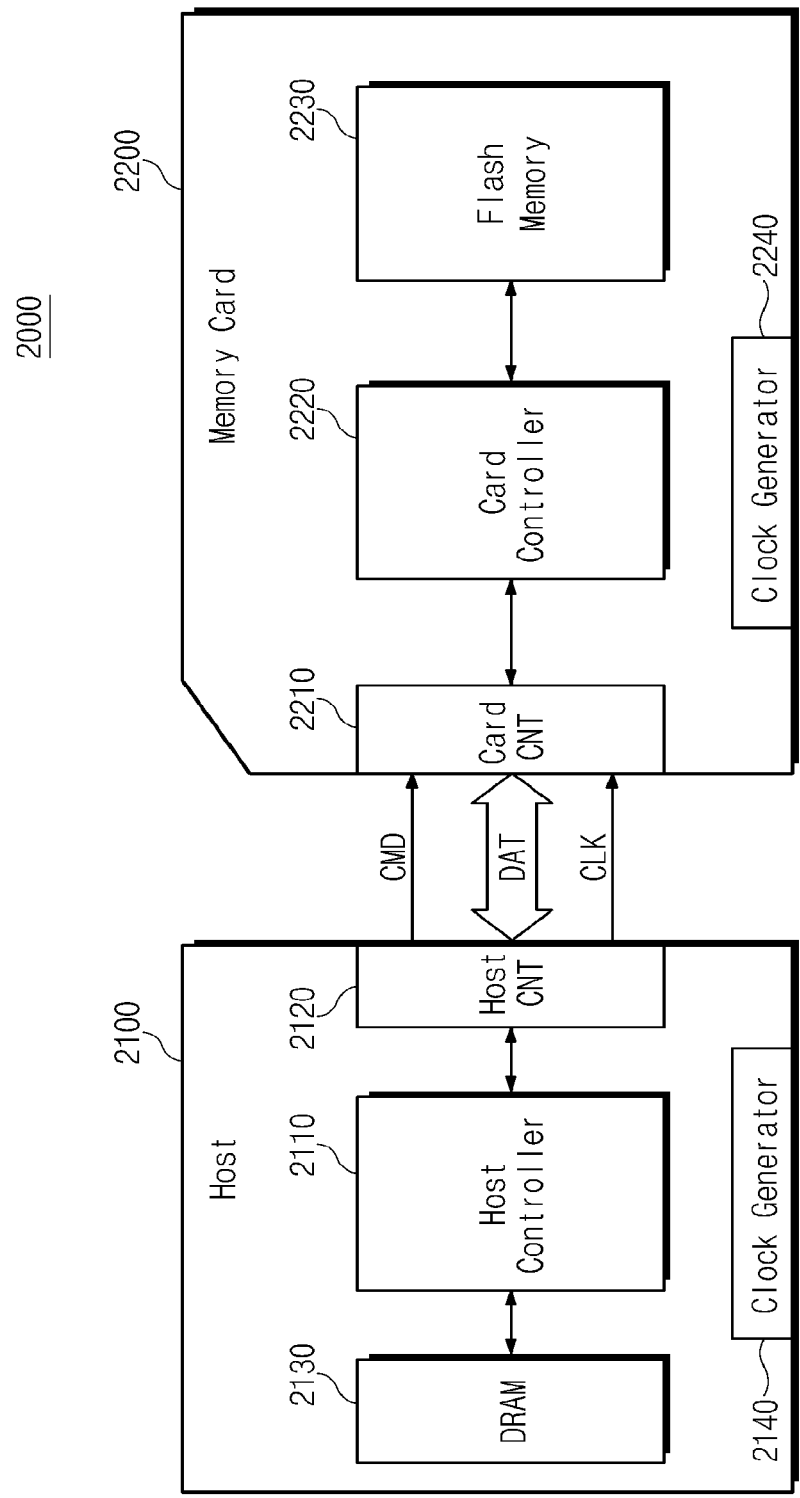
FIG. 8 is a block diagram schematically illustrating a memory card system to which a memory system according to an exemplary embodiment is applied.

FIG. 8 is a block diagram schematically illustrating a memory card system to which a memory system according to an exemplary embodiment. A memory card system 200 may include a host 2100 and a memory card 2200. The host 2100 may include a host controller 2110, a host connection unit (CNT) 2120, and a DRAM 2130.

The host 2100 may write data in the memory card 2200 and read data from the memory card 2200. The host controller 2110 may send a command CMD (e.g., a write command), a clock signal CLK generated from a clock generator 2140 in the host 2100, and data to the memory card 2200 via the host connection unit 2120. The DRAM 2130 may be a main memory of the host 2100.

The memory card 2200 may include a card connection unit (CNT) 2210, a card controller 2220, and a flash memory 2230. The card controller 2220 may store data in the flash memory 2230 in response to a command input via the card CNT 2210. The data may be stored in synchronization with a clock signal generated from a clock generator 2240 in the card controller 2220. The flash memory 2230 may store data transferred from the host 2100. For example, in a case where the host 2100 is a digital camera, the flash memory 2230 may store image data.

In the memory card system 2000 in FIG. 8, the card controller 2220 may include an encryption engine and an encryption key feeder for providing a cipher key to the encryption engine. Lowering of the performance at a read or write operation may be prevented by providing the encryption key feeder independently.

Figure 9:
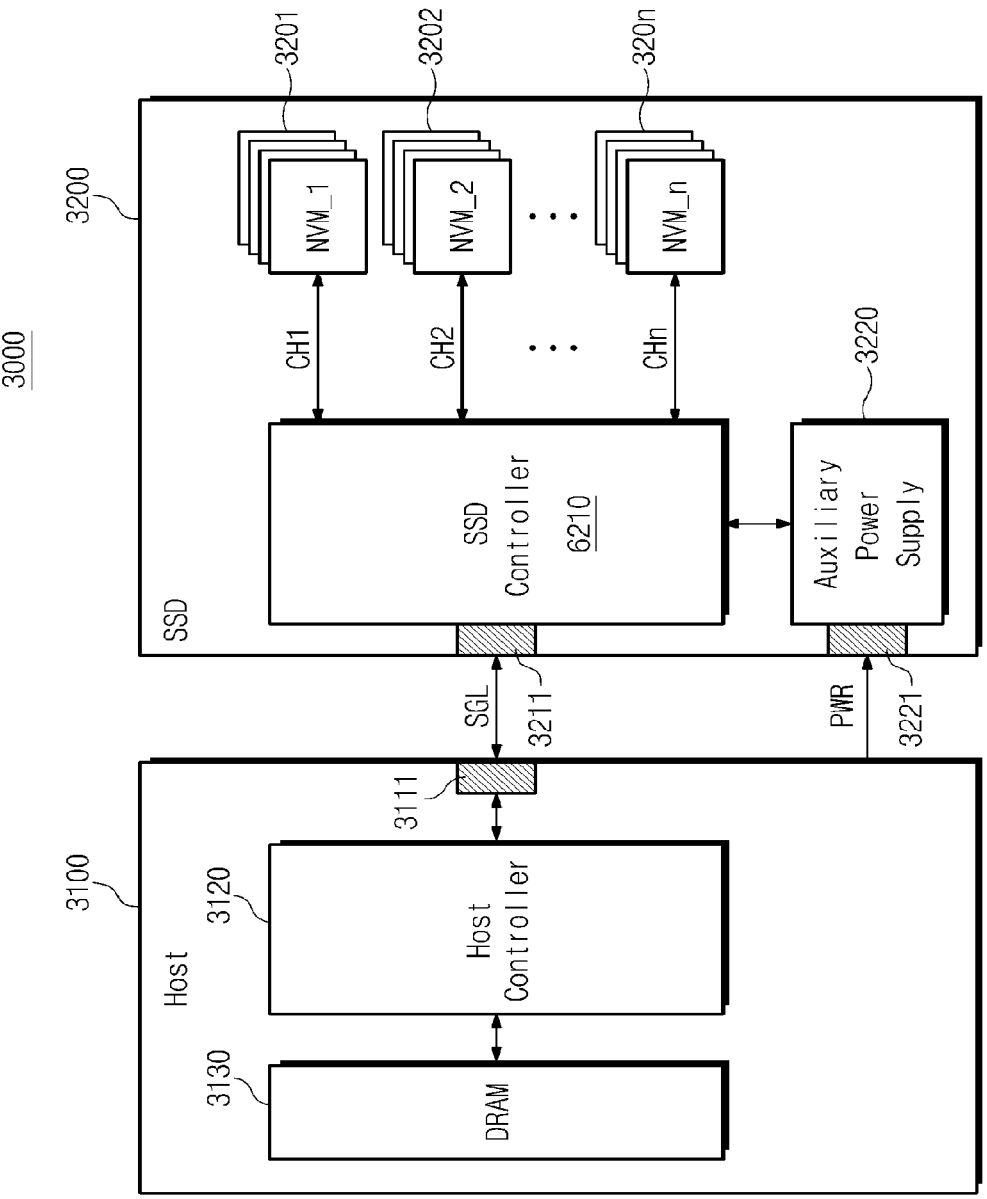
FIG. 9 is a block diagram illustrating a solid state drive system in which a memory system according to an exemplary embodiment is applied.

FIG. 9 is a block diagram illustrating a solid state drive system in which a memory system according to an exemplary embodiment is applied. Referring to FIG. 9, a solid state drive (SSD) system 3000 may include a host 3100 and an SSD 3200. The host 3100 may include a host interface 3111, a host controller 3120, and a DRAM 3130.

The host 3100 may write data in the SSD 3200 or read data from the SSD 3200. The host controller 3120 may transfer signals SGL such as a command, an address, a control signal, and the like to the SSD 3200 via the host interface 3111. The DRAM 3130 may be a main memory of the host 3100.

The SSD 3200 may exchange signals SGL with the host 3100 via the host interface 3211, and may be supplied with a power via a power connector 3221. The SSD 3200 may include a plurality of nonvolatile memories NVM_1 to NVM_n 3201 through 320n, an SSD controller 3210, and an auxiliary power supply 3220. Herein, the nonvolatile memories NVM_1 to NVM_n 3201 to 320n may be implemented by not only a NAND flash memory but also PRAM, MRAM, ReRAM, and the like.

The plurality of nonvolatile memories NVM_1 to NVM_n 3201 through 320n may be used as a storage medium of the SSD 3200. The plurality of nonvolatile memories NVM_1 to NVM_n 3201 to 320n may be connected with the SSD controller 3210 via a plurality of channels CH1 to CHn. One channel may be connected with one or more nonvolatile memories. Nonvolatile memories connected with one channel may be connected with the same data bus.

The SSD controller 3210 may exchange signals SGL with the host 3100 via the host interface 3211. Herein, the signals SGL may include a command, an address, data, and the like. The SSD controller 3210 may be configured to write or read out data to or from a corresponding nonvolatile memory according to a command of the host 3100. The SSD controller 3210 will be more fully described with reference to FIG. 10.

The auxiliary power supply 3220 may be connected with the host 3100 via the power connector 3221. The auxiliary power supply 3220 may be charged by a power PWR from the host 3100. The auxiliary power supply 3220 may be placed within the SSD 3200 or outside the SSD 3200. For example, the auxiliary power supply 3220 may be put on a main board to supply an auxiliary power to the SSD 3200.

Figure 10:
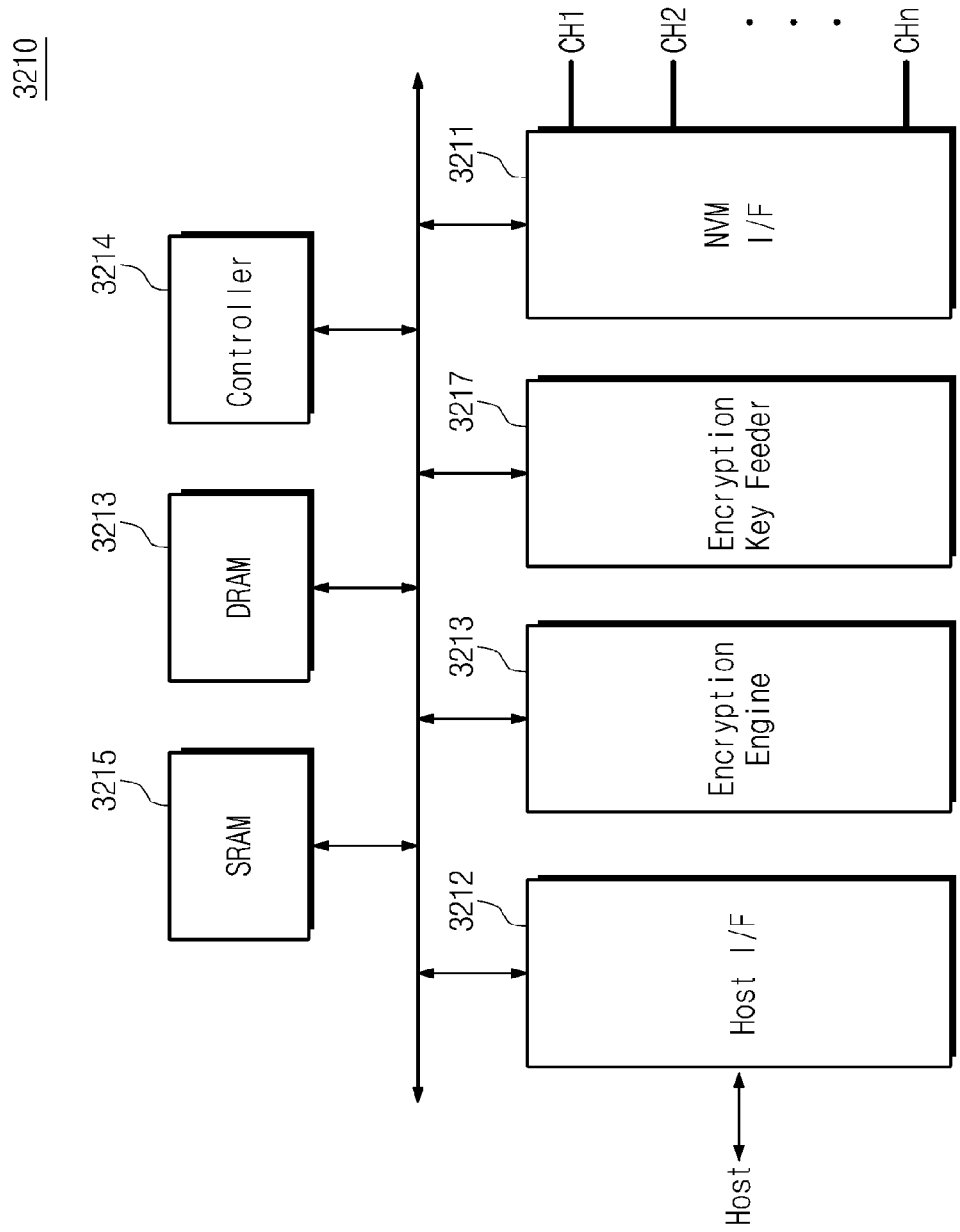
FIG. 10 is a block diagram schematically illustrating an SSD controller in FIG. 9.

FIG. 10 is a block diagram schematically illustrating an SSD controller in FIG. 9. Referring to FIG. 10, an SSD controller 3210 may include an NVM interface (I/F) 3211, a host interface (I/F) 3212, an encryption engine 3213, a controller 3214, an SRAM 3215, a DRAM 3216, and an encryption key feeder 3217.

The NVM interface 3211 may scatter data transferred from a main memory of a host 3100 to channels CH1 to CHn, respectively. The NVM interface 3211 may transfer data read from nonvolatile memories NVM_1 to NVM_n 3201 to 320n to a host 3100 via the host interface 3212.

The host interface 3212 may provide an interface with an SSD 3200 according to the protocol of the host 3100. The host interface 3212 may communicate with the host 3100 using Universal Serial Bus (USB), Small Computer System Interface (SCSI), PCI express, ATA, Parallel ATA (PATA), Serial ATA (SATA), Serial Attached SCSI (SAS), etc. The host interface 3212 may perform a disk emulation function which enables the host 4100 to recognize the SSD 3200 as a hard disk drive (HDD).

The SRAM 3215 may be used to drive software which efficiently manages the nonvolatile memories NVM_1 3201 to NVM_n 320n. The SRAM 3215 may store metadata input from a main memory of the host 3100 or cache data. At a sudden power-off operation, metadata or cache data stored in the SRAM 3215 may be stored in the nonvolatile memories NVM_1 3201 to NVM_n 320n using an auxiliary power supply 3220.

The DRAM 3216 may temporarily store data transferred from a host or from nonvolatile memories NVM_1 3201 to NVM_n 320n. The DRAM 3216 may be placed within the SSD controller 3210. However, the inventive concept is not limited thereto. For example, the DRAM 3216 may be implemented to be located outside the SSD controller 3210. In FIGS. 9 and 10, the SRAM 3215 and the DRAM 3216 can be replaced with a nonvolatile memory. That is, an SSD system 3000 may be configured such that nonvolatile memories such as PRAM, RRAM, MRAM, and the like perform roles of the SRAM 3215 and the DRAM 3216.

The encryption engine 3213 may perform an encryption operation or a decryption operation on data. The encryption engine 3213 may be implemented to correspond to Data Encryption Standard (DES), Triple-Data Encryption Standard (T-DES), Advanced Encryption Standard (AES), and the like, for example.

The encryption key feeder 3217 may be configured to provide the encryption engine 3213 with a cipher key and the like. Lowering of the performance at a read or write operation may be prevented by providing the encryption key feeder independently.

Figure 11:
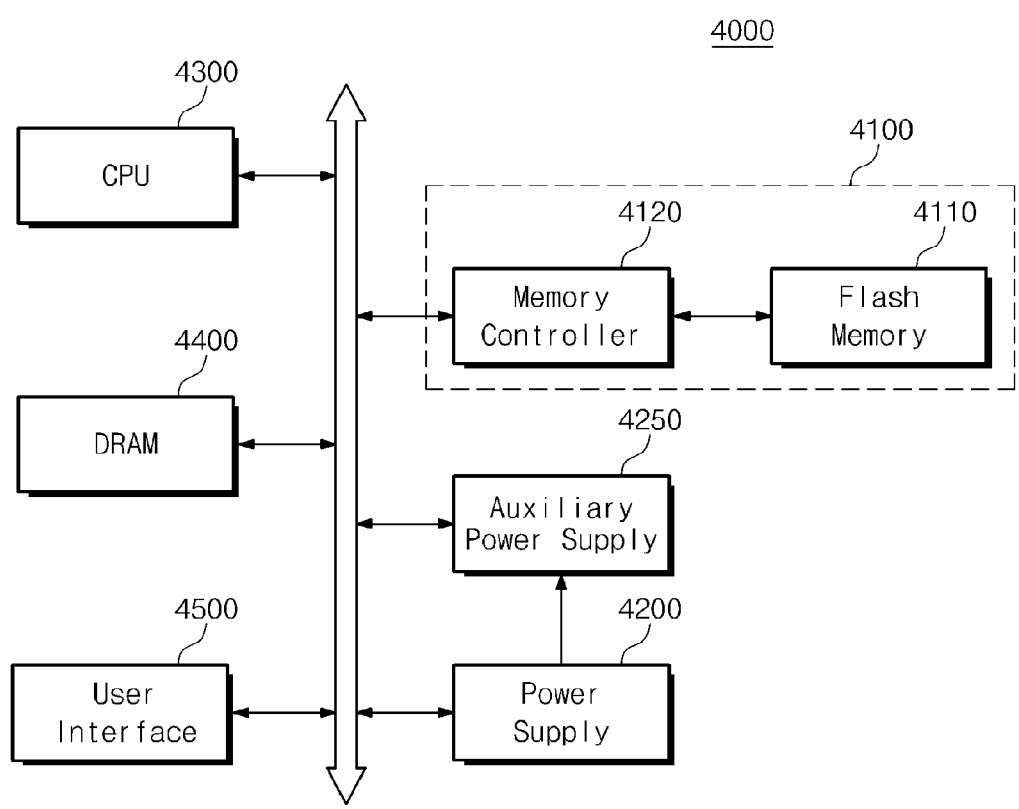
FIG. 11 is a block diagram schematically illustrating an electronic device including a memory system according to an exemplary embodiment.

FIG. 11 is a block diagram schematically illustrating an electronic device including a memory system according to an exemplary embodiment. Herein, an electronic device 4000 may be a personal computer or a handheld electronic device such as a notebook computer, a cellular phone, a PDA, a camera, and the like.

Referring to FIG. 11, the electronic device 4000 may include a memory system 4100, a power supply 4200, an auxiliary power supply 4250, a CPU 4300, a DRAM 4400, and a user interface 4500. The memory system 4100 may include a flash memory 4110 and a memory controller 4120. The memory system 4100 can be embedded within the electronic device 4000.

As described above, the electronic device 4000 may include an encryption engine and an encryption key feeder for providing the encryption engine with a cipher key and the like. Lowering of the performance at a read or write operation may be prevented by providing the encryption key feeder independently.

A memory system according to an exemplary embodiment is applicable to a flash memory having a three-dimensional structure as well as a flash memory having a two-dimensional structure.

Figure 12:
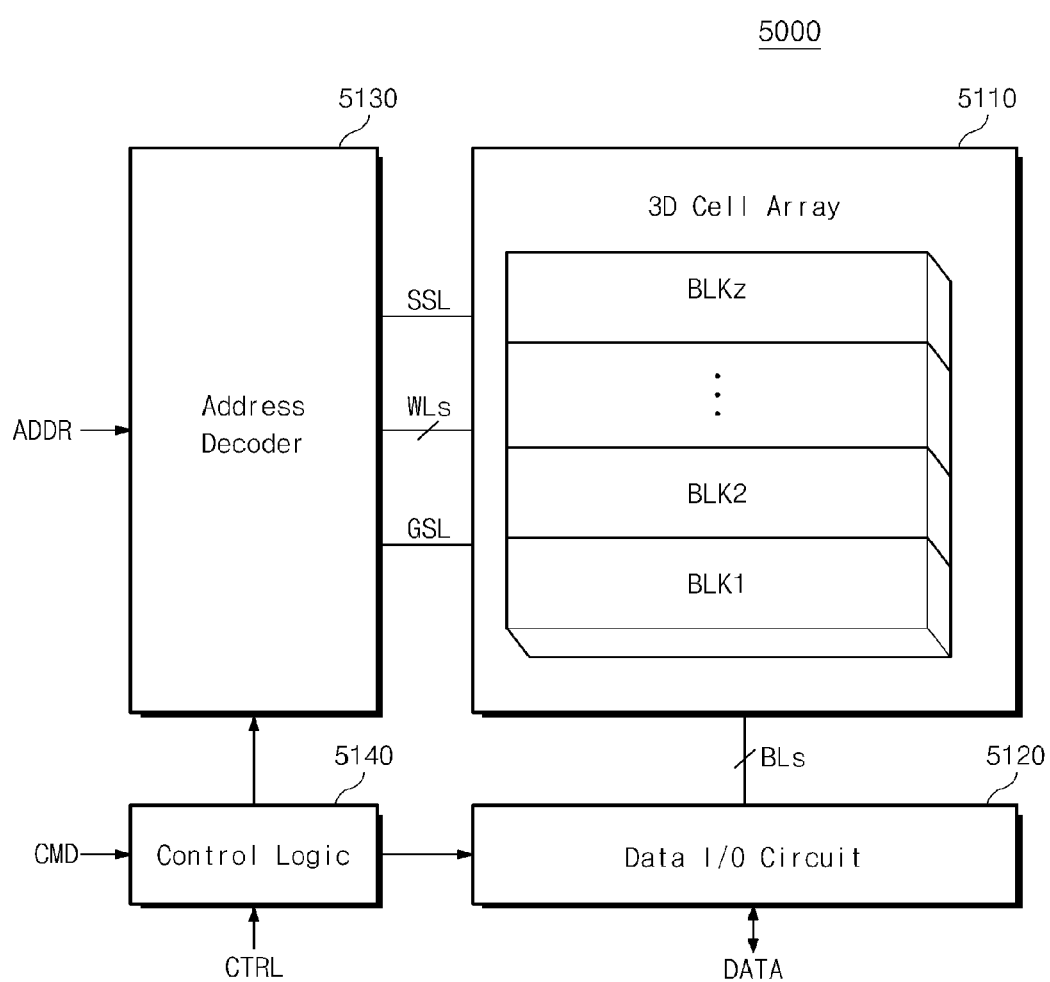
FIG. 12 is a block diagram schematically illustrating a flash memory applying an exemplary embodiment.

FIG. 12 is a block diagram schematically illustrating a flash memory applied to the inventive concept. Referring to FIG. 12, a flash memory 5000 may include a three-dimensional (3D) cell array 5110, a data input/output (I/O) circuit 5120, an address decoder 5130, and control logic 5140.

The 3D cell array 5110 may include a plurality of memory blocks BLK1 to BLKz, each of which is formed to have a three-dimensional structure (or, a vertical structure). For a memory block having a two-dimensional (horizontal) structure, memory cells may be formed in a direction horizontal to a substrate. For a memory block having a three-dimensional structure, memory cells may be formed in a direction perpendicular to the substrate. Each memory block may be an erase unit of the flash memory 5000.

The data (I/O) circuit 5120 may be connected with the 3D cell array 5110 via a plurality of bit lines BLs. The data (I/O) circuit 5120 may receive data from an external device or output data read from the 3D cell array 5110 to the external device. The address decoder 5130 may be connected with the 3D cell array 5110 via a plurality of word lines WLs and selection lines GSL and SSL. The address decoder 5130 may select the word lines in response to an address ADDR.

The control logic 5140 may control programming, erasing, reading, etc. of the flash memory 5000. For example, at programming, the control logic 5140 may control the address decoder 5130 such that a program voltage is supplied to a selected word line, and may control the data input/output circuit 5120 such that data is programmed.

Figure 13:
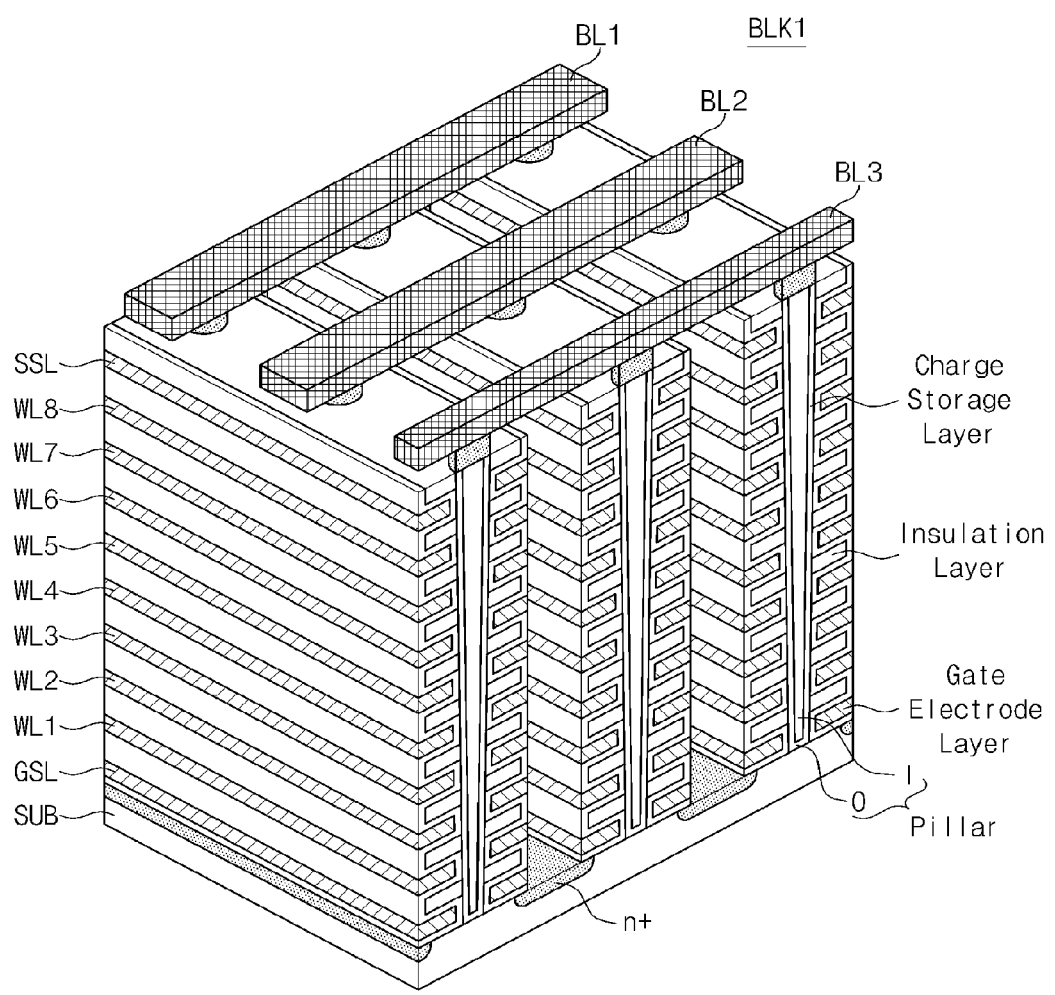
FIG. 13 is a perspective view schematically illustrating a three-dimensional (3D) structure of a memory block illustrated in FIG. 12.

FIG. 13 is a perspective view schematically illustrating a 3D structure of a memory block illustrated in FIG. 12. Referring to FIG. 13, a memory block BLK1 may be formed in a direction perpendicular to a substrate SUB. An n+ doping region may be formed at the substrate SUB. A gate electrode layer and an insulation layer may be deposited on the substrate SUB in turn. A charge storage layer may be formed between the gate electrode layer and the insulation layer.

If the gate electrode layer and the insulation layer are patterned in a vertical direction, a V-shaped pillar may be formed. The pillar may be connected with the substrate SUB via the gate electrode layer and the insulation layer. An outer portion O of the pillar may be formed of a channel semiconductor, and an inner portion I thereof may be formed of an insulation material such as silicon oxide.

The gate electrode layer of the memory block BLK1 may be connected with a ground selection line GSL, a plurality of word lines WL1 to WL8, and a string selection line SSL. The pillar of the memory block BLK1 may be connected with a plurality of bit lines BL1 to BL3. In FIG. 13, there is illustrated the case that one memory block BLK1 has two selection lines SSL and GSL, eight word lines WL1 to WL8, and three bit lines BL1 to BL3. However, the inventive concept is not limited thereto.

Figure 14:
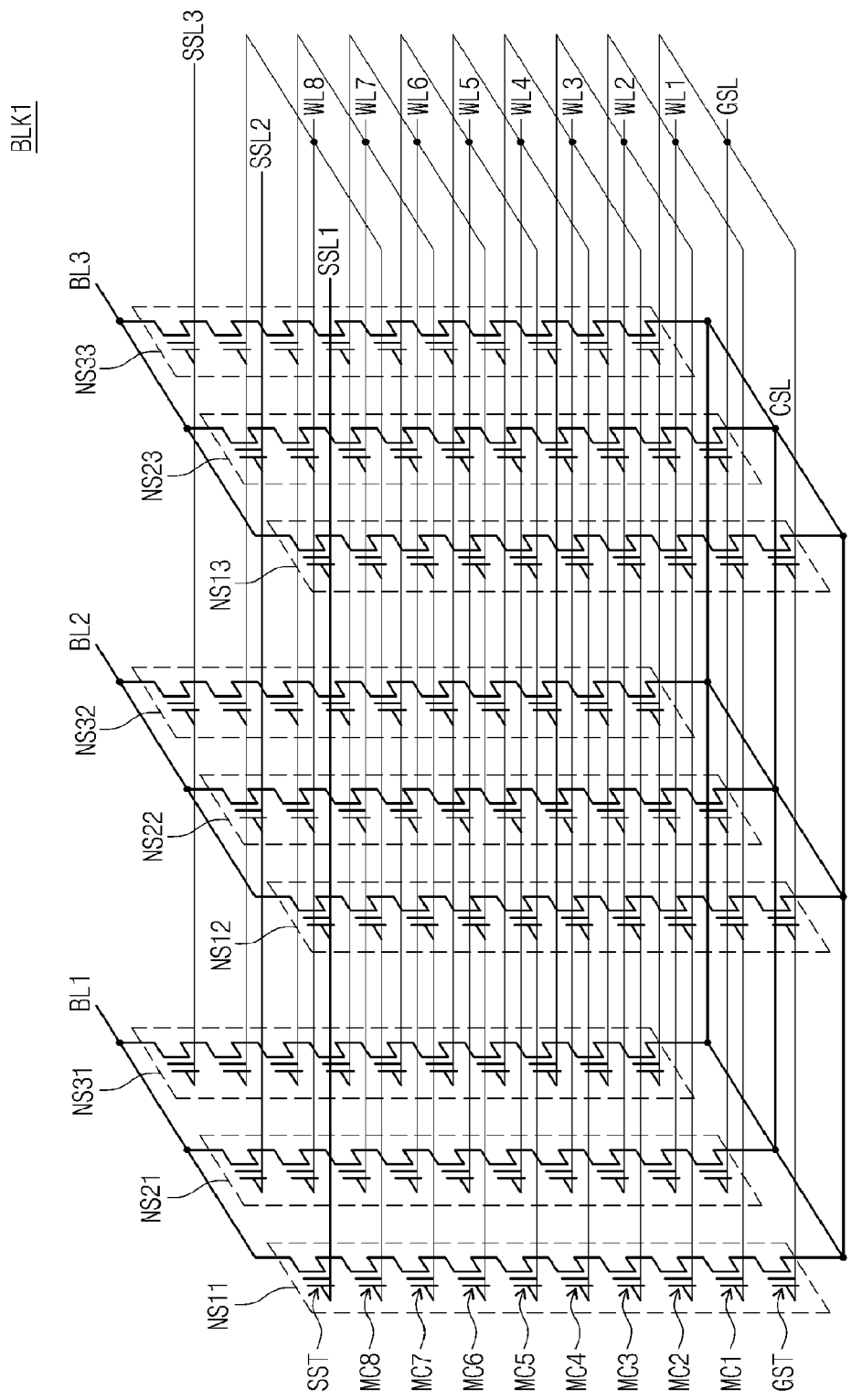
FIG. 14 is a circuit diagram schematically illustrating an equivalent circuit of a memory block illustrated in FIG. 13.

FIG. 14 is a circuit diagram schematically illustrating an equivalent circuit of a memory block illustrated in FIG. 13. Referring to FIG. 14, NAND strings NS11 to NS33 may be connected between bit lines BL1 to BL3 and a common source line CSL. Each NAND string (e.g., NS11) may include a string selection transistor SST, a plurality of memory cells MC1 to MC8, and a ground selection transistor GST.

The string selection transistors SST may be connected with string selection lines SSL1 to SSL3. The memory cells MC1 to MC8 may be connected with corresponding word lines WL1 to WL8, respectively. The ground selection transistors GST may be connected with ground selection line GSL. A string selection transistor SST may be connected with a bit line and a ground selection transistor GST may be connected with a common source line CSL.

Word lines (e.g., WL1) having the same height may be connected in common, and the string selection lines SSL1 to SSL3 may be separated from one another. At programming of memory cells (constituting a page) connected with a first word line WL1 and included in NAND strings NS11, NS12, and NS13, there may be selected a first word line WL1 and a first string selection line SSL1.

While the inventive concept has been described with reference to exemplary embodiments, it will be apparent to those skilled in the art that various changes and modifications may be made without departing from the spirit and scope of the present inventive concept. Therefore, it should be understood that the above exemplary embodiments are not limiting, but illustrative.

What is claimed is:

1. A storage device comprising:
a nonvolatile memory device; and
a memory controller that is configured to control the nonvolatile memory device,
wherein the memory controller comprises:
an encryption key feeder configured to generate a cipher key according to a logical address transferred from a host; and
an encryption engine configured to perform an encryption operation on data transferred from the host or a decryption operation on data transferred from the nonvolatile memory device using the cipher key provided from the encryption key feeder,
wherein the encryption key feeder comprises a key mapper configured to manage key indexes corresponding to logical address ranges, and the key mapper compares a logical address transferred from the host with the logical address ranges,
wherein the key mapper comprises:
a first comparator configured to compare a logical address range (LBA) lower bound value of the logical address range with the logical address;
a second comparator configured to compare an LBA upper bound value of the logical address range with the logical address; and
a logic gate configured to logically combine an output value of the first comparator and an output value of the second comparator,
Wherein the encryption key feeder further comprises a key table module configured to manage cipher keys corresponding to the logical address ranges,
wherein the key mapper sends a key index corresponding to one of the logical address ranges when a logical address transferred from the host belongs to the one of the logical address ranges, and
wherein the key table module provides the encryption engine with a cipher key, corresponding to the key index, from among a plurality of cipher keys.

2. The storage device of claim 1, wherein the memory controller further comprises:
a microprocessor configured to control the encryption engine and the encryption key feeder,
wherein the key mapper provides an interrupt signal to the microprocessor when a logical address transferred from the host does not belong to any of the logical address ranges.

3. The storage device of claim 2, wherein the microprocessor adds a logical address range including the logical address to the key mapper in response to the interrupt signal.

4. The storage device of claim 1, wherein the key mapper comprises:
a first register that stores location information of a logical address range, of which a search operation starts, from among the logical address ranges; and
a second register that stores location information of a logical address range, of which a search operation is being performed, from among the logical address ranges.

5. The storage device of claim 4, wherein when a first logical address provided from the host does not belong to a first logical address range of the logical address ranges, the key mapper compares the first logical address with a next logical address range of the logical address ranges and stores location information of the next logical address range in the second register.

6. The storage device of claim of claim 1, wherein the key mapper receives a second logical address from the host following an input of a first logical address, and
wherein when the first logical address belongs to a first logical address range of the logical address ranges, the key mapper compares the second logical address with the first logical address range.

7. The storage device of claim 1, wherein the nonvolatile memory device comprises a three-dimensional memory array.

8. The storage device of claim 7, wherein the three-dimensional memory array comprises a non-volatile memory that is monolithically formed in one or more physical levels of memory cells having active areas disposed above a silicon substrate.

9. A method of controlling a storage device, the method comprising:
generating a cipher key, by an encryption key feeder comprising a key mapper, according to a logical address transferred from a host; and
performing an encryption operation or a decryption operation, by a cryptographic engine, on data transferred from the host or on data transferred from a nonvolatile memory device using the cipher key provided from the encryption key feeder;
wherein the generating the cipher key comprises comparing a logical address range (LBA) lower bound value of the logical address range with the logical address;
comparing an LBA upper bound value of the logical address range with the logical address;
logically combining an output value of comparison for the LBA lower bound value and an output value of comparison for the LBA upper bound value;
sending a key index corresponding to one of the logical address ranges when a logical address transferred from the host belongs to the one of the logical address ranges; and
providing the cryptographic engine with the cipher key, corresponding to the key index, from among a plurality of cipher keys, and
wherein the nonvolatile memory device comprises a three-dimensional memory array.

10. The method of claim 9, wherein the key indexes correspond to the logical address ranges, and the encryption key feeder further comprises key table module configured to manage cipher keys corresponding to the logical address ranges.

11. The method of claim 9, wherein the three-dimensional memory array comprises a non-volatile memory that is monolithically formed in one or more physical levels of memory cells having active areas disposed above a silicon substrate.

12. A non-transitory computer readable recording medium having embodied thereon a program, which when executed by a processor executes a method of controlling a storage device, the method comprising:
generating a cipher key, by an encryption key feeder comprising a key mapper, according to a logical address transferred from a host; and
performing an encryption operation or a decryption operation, by a cryptographic engine, on data transferred from the host or on data transferred from a nonvolatile memory device using the cipher key provided from the encryption key feeder;
wherein the generating the cipher key comprises comparing a logical address range (LBA) lower bound value of the logical address range with the logical address;
comparing an LBA upper bound value of the logical address range with the logical address;
logically combining an output value of comparison for the LBA lower bound value and an output value of comparison for the LBA upper bound value;
sending a key index corresponding to one of the logical address ranges when a logical address transferred from the host belongs to the one of the logical address ranges; and
providing the cryptographic engine with the cipher key, corresponding to the key index, from among a plurality of cipher keys, and
wherein the nonvolatile memory device comprises a three-dimensional memory array.

13. The non-transitory computer readable recording medium of claim 12, wherein the three-dimensional memory array comprises a non-volatile memory that is monolithically formed in one or more physical levels of memory cells having active areas disposed above a silicon substrate.

* * * * *